(12) United States Patent
Rappas et al.

(10) Patent No.: US 8,286,901 B2
(45) Date of Patent: *Oct. 16, 2012

(54) COAL COMPOSITIONS FOR CATALYTIC GASIFICATION

(75) Inventors: Alkis S. Rappas, Kingwood, TX (US); George Frederick Salem, Aurora, IL (US)

(73) Assignee: Greatpoint Energy, Inc., Cambridge, MA (US)

( * ) Notice: Subject to any disclaimer, the term of this patent is extended or adjusted under 35 U.S.C. 154(b) by 794 days.

This patent is subject to a terminal disclaimer.

(21) Appl. No.: 12/395,353

(22) Filed: Feb. 27, 2009

(65) Prior Publication Data

US 2009/0217586 A1 Sep. 3, 2009

Related U.S. Application Data

(60) Provisional application No. 61/032,688, filed on Feb. 29, 2008.

(51) Int. Cl.
*B02C 11/08* (2006.01)
*F26B 3/02* (2006.01)
*C10L 3/08* (2006.01)

(52) U.S. Cl. .................... 241/23; 34/443; 48/127.7

(58) Field of Classification Search .............. 502/20–56; 48/197 R, 127.7; 700/271, 266, 268; 241/23; 34/443

See application file for complete search history.

(56) References Cited

U.S. PATENT DOCUMENTS

| | | |
|---|---|---|
| 2,694,623 A | 11/1954 | Welty, Jr. et al. |
| 2,791,549 A | 5/1957 | Jahnig |
| 2,813,126 A | 11/1957 | Tierney |
| 2,860,959 A | 11/1958 | Pettyjohn et al. |
| 2,886,405 A | 5/1959 | Benson et al. |
| 3,034,848 A | 5/1962 | King |
| 3,114,930 A | 12/1963 | Oldham et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesselhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovish et al. |
| 4,077,778 A | 3/1978 | Nahas et al. |
| 4,091,073 A | 5/1978 | Winkler |
| 4,092,125 A | 5/1978 | Stambaugh et al. |

(Continued)

FOREIGN PATENT DOCUMENTS

CA 966660 4/1975

(Continued)

OTHER PUBLICATIONS

Asami, K., et al., "Highly Active Iron Catalysts from Ferric Chloride or the Steam Gasification of Brown Coal," ind. Eng. Chem. Res., vol. 32, No. 8, 1993, pp. 1631-1636. Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From a Thermally Ballasted Gasifier," Aug. 2005.

Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.

Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

(Continued)

*Primary Examiner* — Wayne Langel
*Assistant Examiner* — Syed Iqbal
(74) *Attorney, Agent, or Firm* — McDonnell Boehnen Hulbert & Berghoff LLP

(57) ABSTRACT

Particulate compositions are described comprising an intimate mixture of a coal and a gasification catalyst. The particulate compositions are gasified in the presence of steam to yield a plurality of gases including methane and at least one or more of hydrogen, carbon monoxide, carbon dioxide, hydrogen sulfide, ammonia and other higher hydrocarbons. Processes are also provided for the preparation of the particulate compositions and converting the particulate composition into a plurality of gaseous products.

6 Claims, No Drawings

U.S. PATENT DOCUMENTS

| | | |
|---|---|---|
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A * | 6/1982 | Lang et al. ............... 48/202 |
| 4,336,233 A | 6/1982 | Appl et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,236,557 A | 8/1993 | Muller et al. |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |

| | | |
|---|---|---|
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,118,720 B1 | 10/2006 | Mendelsohn et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2005/0287056 A1 | 12/2005 | Baker et al. |
| 2006/0120953 A1* | 6/2006 | Okuyama et al. .......... 423/648.1 |
| 2006/0228290 A1 | 10/2006 | Green |
| 2006/0265953 A1 | 11/2006 | Hobbs |
| 2007/0000177 A1 | 1/2007 | Hippo et al. |
| 2007/0051043 A1 | 3/2007 | Schingnitz et al. |
| 2007/0083072 A1 | 4/2007 | Nahas |
| 2007/0180990 A1 | 8/2007 | Downs et al. |
| 2007/0186472 A1 | 8/2007 | Rabovister et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |

FOREIGN PATENT DOCUMENTS

| | | |
|---|---|---|
| CA | 1003217 | 1/1977 |
| CA | 1041553 | 10/1978 |
| CA | 1106178 | 8/1981 |
| CA | 1 125 026 | 6/1982 |
| CA | 1187702 | 6/1985 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1560873 | 2/1980 |
| GB | 1 599 932 | 10/1981 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |

| | | |
|---|---|---|
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | WO 2010/132551 | 11/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | WO 2011/034890 | 3/2011 |
| WO | 2011/063608 | 6/2011 |
| WO | WO 2012/024369 | 2/2012 |

OTHER PUBLICATIONS

Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.

Nahas, n. C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.

Coal Data: A Reference, Energy Information Administration, Office of Coal, Nuclear, Electric, and Alternate Fuels U.S. Department of Energy, DOE/EIA-0064(93), Feb. 1995.

Deepak Tandon, Dissertation Approval, "Low Temperature and Elevated Pressure Steam Gasification of Illinois Coal", Jun. 13, 1996.

Demibras, "Demineralization of Agricultural Residues by Water Leaching", *Energy Sources*, vol. 25, pp. 679-687, (2003).

Gallagher Jr., et al., "Catalytic Coal Gasification for SNG Manufacture", *Energy Research*, vol. 4, pp. 137-147, (1980).

Heinemann, et al., "Fundamental and Exploratory Studies of Catalytic Steam Gasification of Carbonaceous Materials", Final Report Fiscal Years 1985-1994.

Jensen, et al. Removal of K and Cl by leaching of straw char, *Biomass and Bioenergy*, vol. 20, pp. 447-457, (2001).

Mengjie, et al., "A potential renewable resource development and utilization of biomass energy", http://www.fao.org.docrep/T4470E/t4470e0n.htm, pp. 1-8.

Meyers, et al. Fly Ash as a Construction Material for Highways, A Manual. Federal Highway Administration, Report No. FHWA-IP-76-16, Washington, DC, 1976.

Moulton, Lyle K. "Bottom Ash and Boiler Slag", *Proceedings of the Third International Ash Utilization Symposium*, U.S. Bureau of Mines, Information Circular No. 8640, Washington, DC, 1973.

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", *Fuel Processing Technology*, vol. 86, pp. 375-389, (2004).

Gerdes, Kristin, et al., "Integrated Gasification Fuel Cell Performance and Cost Assessment," National Energy Technology Laboratory, U.S. Department of Energy, Mar. 27, 2009, pp. 1-26.

Ghosh, S., et al., "Energy Analysis of a Cogeneration Plant Using Coal Gasification and Solid Oxide Fuel Cell," Energy, 2006, vol. 31, No. 2-3, pp. 345-363.

Jeon, S.K., et al., "Characteristics of Steam Hydrogasification of Wood Using a Micro-Batch Reactor," Fuel, 2007, vol. 86, pp. 2817-2823.

Li, Mu, et al., "Design of Highly Efficient Coal-Based Integrated Gasification Fuel Cell Power Plants," Journal of Power Sources, 2010, vol. 195, pp. 5707-5718.

Prins, M.J., et al., "Exergetic Optimisation of a Production Process of Fischer-Tropsch Fuels from Biomass," Fuel Processing Technology, 2005, vol. 86, No. 4, pp. 375-389.

U.S. Appl. No. 13/484,918, filed May 31, 2012.

U.S. Appl. No. 13/402,022, filed Feb. 22, 2012.

U.S. Appl. No. 13/450,995, filed Apr. 19, 2012.

Adsorption, http://en.wikipedia.org/wiki/Adsorption, pp. 1-8 (Oct. 17, 2007).

Amine gas treating, http://en.wikipedia.org/wiki/Acid_gas_removal, pp. 1-4 (Oct. 21, 2007).

Coal, http://en.wikipedia.org/wiki/Coal_gasification, pp. 1-8 (Oct. 29, 2007).

Fluidized Bed Gasifiers, http://www.energyproducts.com/fluidized_bed_gasifiers.htm, pp. 1-5 (Oct. 24, 2007).

Gas separation, http://en.wikipedia.org/wiki/Gas_separation, pp. 1-2 (Feb. 24, 2007).

Gasification, http://en.wikipedia.org/wiki/Gasification, pp. 1-6 (Oct. 29, 2007).

Mengjie, et al., "A potential renewable energy resource development and utilization of biomass energy", http://www.fao.org.docrep/T4470E/t4470e0n.htm, pp. 1-8 (1994).

Natural gas processing, http://en.wikipedia.org/wiki/Natural_gas_processing, pp. 1-4 (Oct. 22, 2007).

Reboiler, http://en.wikipedia.org/wiki/Reboiler, pp. 1-4 (Nov. 11, 2007).

What is XPS?, http://www.nuance.northwestern.edu/Keckll/xps1.asp, pp. 1-2 (2006).

2.3 Types of gasifiers, http://www.fao.org/docrep/t0512e/T0512e0a.htm, pp. 1-6 (1986).

2.4 Gasification fuels, http://www.fao.org/docrep/t0512e/T0512e0b.htm#TopofPage, pp. 1-8 (1986).

2.5 Design of downdraught gasifiers, http://www.fao.org/docrep/t0512e/T0512e0c.htm#TopOfPage, pp. 1-8 (1986).

2.6 Gas cleaning and cooling, http://www.fao.org/docrep/t0512e0d.htm#TopOFPage, pp. 1-3 (1986).

A.G. Collot et al., "Co-pyrolysis and co-gasification of coal and biomass in bench-scale fixed-bed and fluidized bed reactors", (1999) Fuel 78, pp. 667-679.

Wenkui Zhu et al., "Catalytic gasification of char from co-pyrolysis of coal and biomass", (2008) Fuel Processing Technology, vol. 89, pp. 890-896.

Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.

Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.

Brown et al., "Biomass-Derived Hydrogen From a thermally Ballasted Gasifier", Final Technical Report, Iowa State University, Aug. 2005.

Chiaramonte et al, "Upgrade Coke by Gasification", (1982) Hydrocarbon Processing, vol. 61 (9), pp. 255-257.

\* cited by examiner

COAL COMPOSITIONS FOR CATALYTIC GASIFICATION

CROSS-REFERENCE TO RELATED APPLICATIONS

This application claims priority under 35 U.S.C. §119 from U.S. Provisional Application Ser. No. 61/032,688 (filed Feb. 29, 2008), the disclosure of which is incorporated by reference herein for all purposes as if fully set forth.

FIELD OF THE INVENTION

The invention relates to particulate compositions of coal and petroleum coke, and at least one alkali metal gasification catalyst, one transition metal gasification catalyst, and one alkaline earth metal source. Further, the invention relates to processes for preparation of the particulate compositions and for gasification of the same in the presence of steam to form gaseous products, and in particular, methane.

BACKGROUND OF THE INVENTION

In view of numerous factors such as higher energy prices and environmental concerns, the production of value-added gaseous products from lower-fuel-value carbonaceous feedstocks, such as biomass, coal and petroleum coke, is receiving renewed attention. The catalytic gasification of such materials to produce methane and other value-added gases is disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1, US2006/0265953A1, US2007/000177A1, US2007/083072A1, US2007/0277437A1 and GB 1599932.

Petroleum coke is a generally solid carbonaceous residue derived from the delayed coking or fluid coking a carbon source such as a crude oil residue, and the coking processes used for upgrading oil sand. Petroleum cokes, in general, have poor gasification reactivity, particularly at moderate temperatures, due to their highly crystalline carbon and elevated levels of organic sulfur derived from heavy-gravity oil. Use of catalysts is necessary for improving the lower reactivity of petroleum cokes, however, certain types of catalysts can be poisoned by the sulfur-containing compounds in the pet-cokes.

Treatment of petroleum coke alone can have very high theoretical carbon conversion (e.g. 98%), but has its own challenges regarding maintaining bed composition, fluidization of the bed in the gasification reactor, control of possible liquid phases and agglomeration of the bed in the gasification reactor and char withdrawal. Additionally, petroleum coke has inherently low moisture content, and a very low water soaking capacity to allow for conventional catalyst impregnation methods. Therefore, methods and compositions are needed which can support and provide a gasification catalyst for the gasification of petroleum coke.

SUMMARY OF THE INVENTION

In a first aspect, the invention provides a particulate composition comprising an intimate mixture, the intimate mixture comprising:
  (a) a petroleum coke particulate;
  (b) a coal particulate;
  (c) a transition metal gasification catalyst;
  (d) an alkaline earth metal source; and
  (e) an alkali metal gasification catalyst;
wherein: (i) the petroleum coke particulate and the coal particulate have a size distribution suitable for gasification in a fluidized bed zone;
  (ii) the petroleum coke and the coal are present in the particulate composition in a weight ratio ranging from about 5:95 to about 95:5;
  (iii) the transition gasification catalyst, the alkaline earth metal source, and alkali metal gasification catalyst are loaded onto the coal particulate, the petroleum coke particulate, or both;
  (iv) in the presence of steam and under suitable temperature and pressure, the particulate composition exhibits gasification activity whereby a plurality of gases including methane and at least one or more of hydrogen, carbon monoxide, carbon dioxide, hydrogen sulfide, ammonia, and other higher hydrocarbons are formed;
  (v) the transition metal gasification catalyst is present in an amount sufficient to provide, in the particulate composition, a ratio of transition metal atoms to carbon atoms ranging from about 0.001 to about 0.10;
  (vi) the alkaline earth metal source is present in an amount sufficient to provide, in the particulate composition, from about 0.1 wt % to about 3.0 wt % alkaline earth metal atoms on a dry basis; and
  (vii) the alkali metal gasification catalyst is present in an amount sufficient to provide, in the particulate composition, a ratio of alkali metal atoms to carbon atoms ranging from about 0.01 to about 0.08.

In a second aspect, the invention provides a process for converting a particulate composition into a plurality of gaseous products, the process comprising the steps of:
  (a) supplying a particulate composition according to the first aspect of the invention to a gasification reactor;
  (b) reacting the particulate composition in the gasification reactor in the presence of steam and under suitable temperature and pressure to form a plurality of gaseous products including methane and at least one or more of hydrogen, carbon monoxide, carbon dioxide, hydrogen sulfide, ammonia, and other higher hydrocarbons; and
  (c) at least partially separating the plurality of gaseous products to produce a stream comprising a predominant amount of one of the gaseous products.

In a third aspect, the invention provides a process for preparing a particulate composition, the process comprising the steps of:
  (a) providing a petroleum coke particulate;
  (b) providing a first coal feedstock, a second coal feedstock and, optionally, a third coal feedstock, each in particulate form;
  (c) contacting one of the petroleum coke particulate, the first coal feedstock, the second coal feedstock or the third coal feedstock, with a first aqueous solution comprising a transition metal gasification catalyst to form a first slurry;
  (d) contacting one of petroleum coke particulate, the first coal feedstock, the second coal feedstock or the third coal feedstock, other than the one used for step (c), with a second aqueous solution comprising an alkaline earth metal source to form a second slurry;

(e) contacting one of the petroleum coke feedstock, the first coal feedstock, the second coal feedstock or the third coal feedstock, other than ones used for steps (c) and (d), with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing at least a portion of each of the first particulate, the second particulate, and the third particulate to form a particulate composition, wherein, if the petroleum coke particulate is not used in step (c), (d) or (e), the third coal feedstock is provided and is used in one of steps (c), (d) or (e), and the petroleum coke particulate is mixed with at least a portion of each of the first particulate, second particulate and third particulate to form a particulate composition.

In a fourth aspect, the invention provides a process for preparing a particulate composition, the process comprising the steps of:

(a) providing a petroleum coke particulate;

(b) providing a first coal feedstock, a second coal feedstock, and a third coal feedstock, all in particulate form;

(c) contacting the first coal feedstock with a first aqueous solution comprising a transition metal gasification catalyst to form a first slurry;

(d) contacting the second coal feedstock with a second aqueous solution comprising an alkaline earth metal source to form a second slurry;

(e) contacting the third coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing the petroleum coke particulate with at least a portion of the first particulate, at least a portion of the second particulate, and at least a portion of the third particulate to form a particulate composition.

In a fifth aspect, the invention provides a process for preparing a particulate composition, the process comprising the steps of:

(a) providing a petroleum coke particulate;

(b) providing a first coal feedstock and a second coal feedstock, both in particulate form;

(c) contacting one of the petroleum coke particulate, first coal feedstock or second coal feedstock with a first aqueous solution comprising a transition metal gasification catalyst to form a first slurry;

(d) contacting one of petroleum coke particulate, the first coal feedstock or the second coal feedstock, other than the one used for step (c), with a second aqueous solution comprising an alkaline earth metal source to form a second slurry;

(e) contacting one of the petroleum coke feedstock, the first coal feedstock or the second coal feedstock, other than ones used for steps (c) and (d), with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing at least a portion of the first particulate, at least a portion of the second particulate, and at least a portion of the third particulate to form a particulate composition.

In a sixth aspect, the invention provides a process for preparing a particulate composition, the process comprising the steps of:

(a) providing a petroleum coke particulate;

(b) providing a first coal feedstock and a second coal feedstock, both in particulate form;

(c) contacting the petroleum coke particulate with a first aqueous solution comprising a transition metal gasification catalyst to form a first slurry;

(d) contacting the first coal feedstock with a second aqueous solution comprising an alkaline earth metal source to form a second slurry;

(e) contacting the second coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing at least a portion of the first particulate, at least a portion of the second particulate, and at least a portion of the third particulate to form a particulate composition.

In a seventh aspect, the invention provides a process for preparing a particulate composition, the process comprising the steps of:

(a) providing a petroleum coke particulate;

(b) providing a first coal feedstock and a second coal feedstock, both in particulate form;

(c) contacting the first coal feedstock with a first aqueous solution comprising a transition metal gasification catalyst to form a first slurry;

(d) contacting the petroleum coke particulate with a second aqueous solution comprising an alkaline earth metal source to form a second slurry;

(e) contacting the second coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing at least a portion of the first particulate, at least a portion of the second particulate, and at least a portion of the third particulate to form a particulate composition.

In an eighth aspect, the invention provides a process for preparing a particulate composition, the process comprising the steps of:

(a) providing a petroleum coke particulate;

(b) providing a first coal feedstock and a second coal feedstock, both in particulate form;

(c) contacting the first coal feedstock with a first aqueous solution comprising a transition metal gasification catalyst to form a first slurry;

(d) contacting the second coal feedstock with a second aqueous solution comprising an alkaline earth metal source to form a second slurry;

(e) contacting the petroleum coke particulate with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing at least a portion of the first particulate, at least a portion of the second particulate, and at least a portion of the third particulate to form a particulate composition.

In a ninth aspect, the invention provides a process for preparing a particulate composition, the process comprising the steps of:

(a) providing a petroleum coke particulate;

(b) providing a first coal feedstock, a second coal feedstock and, optionally, a third coal feedstock, each in particulate form;

(c) contacting one of the petroleum coke particulate, the first coal feedstock, the second coal feedstock or the third coal feedstock, with a first aqueous solution comprising a transition metal gasification catalyst to form a first slurry;

(d) contacting one of petroleum coke particulate, the first coal feedstock, the second coal feedstock or the third coal feedstock, other than the one used for step (c), with a second aqueous solution comprising an alkaline earth metal source to form a second slurry;

(e) contacting one of the petroleum coke feedstock, the first coal feedstock, the second coal feedstock or the third coal feedstock, other than ones used for steps (c) and (d), with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining at least a portion of each of the first wet cake, the second wet cake, and the third wet cake to form a final wet cake; and (h) optionally thermally treating the final wet cake with a dry inert gas as needed to form a particulate composition, wherein, if the petroleum coke particulate is not used in step (c), (d) or (e), the third coal feedstock is provided and is used in one of steps (c), (d) or (e); and (i) the petroleum coke particulate is mixed with at least a portion of each of the first wet cake, the second wet cake and the third wet cake to form the final wet cake, which is optionally thermally treated with a dry inert gas as needed to form a particulate composition;

(ii) the petroleum coke particulate is mixed with at least a portion of the final wet cake, which is optionally thermally treated with a dry inert gas as needed to form a particulate composition; or (iii) the petroleum coke particulate is mixed with at least a portion of the particulate composition from step (h).

In a tenth aspect, the invention provides a process for preparing a particulate composition, the process comprising the steps of:

(a) providing a petroleum coke particulate;

(b) providing a first coal feedstock, a second coal feedstock, and a third coal feedstock, all in particulate form;

(c) contacting the first coal feedstock with a first aqueous solution comprising a transition metal gasification catalyst to form a first slurry;

(d) contacting the second coal feedstock with a second aqueous solution comprising an alkaline earth metal source to form a second slurry;

(e) contacting the third coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining the first wet cake, the second wet cake, and the third wet cake to form a final wet cake; and (h) mixing the petroleum coke particulate with at least a portion of the final wet cake to provide a particulate composition.

In an eleventh aspect, the invention provides a process for preparing a particulate composition, the process comprising the steps of:

(a) providing a petroleum coke particulate;

(b) providing a first coal feedstock and a second coal feedstock, both in particulate form;

(c) contacting one of the petroleum coke particulate, first coal feedstock or second coal feedstock with a first aqueous solution comprising a transition metal gasification catalyst to form a first slurry;

(d) contacting one of petroleum coke particulate, the first coal feedstock or the second coal feedstock, other than the one used for step (c), with a second aqueous solution comprising an alkaline earth metal source to form a second slurry;

(e) contacting one of the petroleum coke feedstock, the first coal feedstock or the second coal feedstock, other than ones used for steps (c) and (d), with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining at least a portion of the first wet cake, at least a portion of the second wet cake, and at least a portion of the third wet cake to form a final wet cake; and (h) thermally treating the final wet cake with a dry inert gas to form a particulate composition.

In a twelfth aspect, the invention provides a process for preparing a particulate composition, the process comprising the steps of:

(a) providing a petroleum coke particulate;

(b) providing a first coal feedstock and a second coal feedstock, both in particulate form;

(c) contacting the petroleum coke particulate with a first aqueous solution comprising a transition metal gasification catalyst to form a first slurry;

(d) contacting the first coal feedstock with a second aqueous solution comprising an alkaline earth metal source to form a second slurry;

(e) contacting the second coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining at least a portion of the first wet cake, at least a portion of the second wet cake, and at least a portion of the third wet cake to form a final wet cake; and (h) thermally treating the final wet cake with a dry inert gas to form a particulate composition.

In a thirteenth aspect, the invention provides a process for preparing a particulate composition, the process comprising the steps of:

(a) providing a petroleum coke particulate;

(b) providing a first coal feedstock and a second coal feedstock in particulate form;

(c) contacting the first coal feedstock with a first aqueous solution comprising a transition metal gasification catalyst to form a first slurry;

(d) contacting the petroleum coke particulate with a second aqueous solution comprising an alkaline earth metal source to form a second slurry;

(e) contacting the second coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining at least a portion of the first wet cake, at least a portion of the second wet cake, and at least a portion of the third wet cake to form a final wet cake; and (h) thermally treating the final wet cake with a dry inert gas to form a particulate composition.

In a fourteenth aspect, the invention provides a process for preparing a particulate composition, the process comprising the steps of:

(a) providing a petroleum coke particulate;

(b) providing a first coal feedstock and a second coal feedstock in particulate form;

(c) contacting the first coal feedstock with a first aqueous solution comprising a transition metal gasification catalyst to form a first slurry;

(d) contacting the second coal feedstock with a second aqueous solution comprising an alkaline earth metal source to form a second slurry;

(e) contacting the petroleum coke particulate with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining at least a portion of the first wet cake, at least a portion of the second wet cake, and at least a portion of the third wet cake to form a final wet cake; and (h) thermally treating the final wet cake with a dry inert gas to form a particulate composition.

In a fifteenth aspect, the invention provides a particulate composition prepared according to the third through the fourteenth aspects of the invention.

DETAILED DESCRIPTION

The present invention relates to a particulate composition, methods for the preparation of the particulate composition, and methods for the catalytic gasification of the particulate composition. Generally, the particulate composition includes one or more petroleum cokes in various blends with one or more coals, for example, high ash and/or high moisture content coals, particularly low ranking coals such as lignites, sub-bituminous coals, and mixtures thereof. Such particulate compositions can provide for an economical and commercially practical process for catalytic gasification of coals, such as lignites or sub-bituminous coal, with high ash and moisture contents to yield methane and other value-added gases as a product. Such particulate compositions also serve to reduce or eliminate some technical challenges associated with the catalytic gasification of petroleum coke. The particulate compositions and processes described herein identify methods to efficiently exploit these different feeds in a commercially practical gasification process by processing them as blended feedstock.

The invention can be practiced, for example, using any of the developments to catalytic gasification technology disclosed in commonly owned US2007/0000177A1, US2007/0083072A1 and US2007/0277437A1; and U.S. patent application Ser. Nos. 12/178,380 (filed 23 Jul. 2008), U.S. Ser. No. 12/234,012 (filed 19 Sep. 2008) and U.S. Ser. No. 12/234,018 (filed 19 Sep. 2008). All of the above are incorporated by reference herein for all purposes as if fully set forth.

Moreover, the present invention can be practiced in conjunction with the subject matter of the following U.S. patent Applications, each of which was filed on Dec. 28, 2008: U.S. Ser. No. 12/342,554, entitled "CATALYTIC GASIFICATION PROCESS WITH RECOVERY OF ALKALI METAL FROM CHAR"; U.S. Ser. No. 12/342,565, entitled "PETROLEUM COKE COMPOSITIONS FOR CATALYTIC GASIFICATION"; U.S. Ser. No. 12/342,578, entitled "COAL COMPOSITIONS FOR CATALYTIC GASIFICATION"; U.S. Ser. No. 12/342,596, entitled "PROCESSES FOR MAKING SYNTHESIS GAS AND SYNGAS-DERIVED PRODUCTS"; U.S. Ser. No. 12/342,608, entitled "PETROLEUM COKE COMPOSITIONS FOR CATALYTIC GASIFICATION"; U.S. Ser. No. 12/342,628, entitled "PROCESSES FOR MAKING SYNGAS-DERIVED PRODUCTS"; U.S. Ser. No. 12/342,663, entitled "CARBONACEOUS FUELS AND PROCESSES FOR MAKING AND USING THEM"; U.S. Ser. No. 12/342,715, entitled "CATALYTIC GASIFICATION PROCESS WITH RECOVERY OF ALKALI METAL FROM CHAR"; U.S. Ser. No. 12/342,736, entitled "CATALYTIC GASIFICATION PROCESS WITH RECOVERY OF ALKALI METAL FROM CHAR"; U.S. Ser. No. 12/343,143, entitled "CATALYTIC GASIFICATION PROCESS WITH RECOVERY OF ALKALI METAL FROM CHAR"; U.S. Ser. No. 12/343,149, entitled "STEAM GENERATING SLURRY GASIFIER FOR THE CATALYTIC GASIFICATION OF A CARBONACEOUS FEEDSTOCK"; and U.S. Ser. No. 12/343,159, entitled "CONTINUOUS PROCESSES FOR CONVERTING CARBONACEOUS FEEDSTOCK INTO GASEOUS PRODUCTS". All of the above are incorporated by reference herein for all purposes as if fully set forth.

Further, the present invention can be practiced in conjunction with the subject matter of the following U.S. patent applications, each of which was filed concurrently herewith: Ser. No. 12/395,293, entitled "PROCESSES FOR MAKING ABSORBENTS AND PROCESSES FOR REMOVING CONTAMINANTS FROM FLUIDS USING THEM"; Ser. No. 12/395,309, entitled "STEAM GENERATION PROCESSES UTILIZING BIOMASS FEEDSTOCKS"; Ser. No. 12/395,320, entitled "REDUCED CARBON FOOTPRINT STEAM GENERATION PROCESSES"; Ser. No. 12/395,330, entitled "PROCESS AND APPARATUS FOR THE SEPARATION OF METHANE FROM A GAS STREAM"; Ser. No. 12/395,344, entitled "SELECTIVE REMOVAL AND RECOVERY OF ACID GASES FROM GASIFICATION PRODUCTS"; Ser. No. 12/395,348, entitled "COAL COMPOSITIONS FOR CATALYTIC GASIFICATION"; Ser. No. 12/395,372, entitled "CO-FEED OF BIOMASS AS SOURCE OF MAKEUP CATALYSTS FOR CATALYTIC COAL GASIFICATION"; Ser. No. 12/395,381, entitled "COMPACTOR-FEEDER"; Ser. No. 12/395,385, entitled "CARBONACEOUS FINES RECYCLE"; Ser. No. 12/395,429, entitled "BIOMASS CHAR COMPOSITIONS FOR CATALYTIC GASIFICATION"; and Ser. No. 12/395,433, entitled "CATALYTIC GASIFICATION PARTICULATE COMPOSITIONS"; and Ser. No. 12/395,447, entitled "BIOMASS COMPOSITIONS FOR CATALYTIC GASIFICATION". All of the above are incorporated herein by reference for all purposes as if fully set forth.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present invention be limited to the specific values recited when defining a range.

When the term "about" is used in describing a value or an end-point of a range, the invention should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting.

Petroleum Coke

The term "petroleum coke" as used herein includes both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petroleum coke.

Resid petcoke can be derived from a crude oil, for example, by coking processes used for upgrading heavy-gravity residual crude oil, which petroleum coke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt. %, based on the overall weight of the tar sands petcoke. Typically, the ash in such higher-ash cokes predominantly comprises materials such as silica and/or alumina.

Petroleum coke in general has an inherently low moisture content typically in the range of from about 0.2 to about 2 wt % (based on total petroleum coke weight); it also typically has a very low water soaking capacity to allow for conventional catalyst impregnation methods. The particulate composition of this invention eliminates this problem and uses the low moisture content in the petroleum coke for advantageous effects in a petroleum coke—coal blends. The resulting particulate compositions contain, for example, a lower average moisture content which increases the efficiency of downstream drying operation versus conventional drying operations.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % percent inorganic compounds, based on the weight of the petroleum coke.

Coal

The term "coal" as used herein means peat, lignite, sub-bituminous coal, bituminous coal, anthracite, or mixtures thereof. In certain embodiments, the coal has a carbon content of less than about 90%, less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 90%, or up to about 85%, or up to about 80%, or up to about 75% by weight, based on the total coal weight. Examples of useful coals include, but are not limited to, Illinois #6, Pittsburgh #8, Beulah (N. Dak.), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, e.g., *Coal Data: A Reference*, Energy Information Administration, Office of Coal, Nuclear, Electric and Alternate Fuels, U.S. Department of Energy, DOE/EIA-0064(93), February 1995.

Catalyst Components

Particulate compositions of the invention are based on the above-described petroleum coke and coal, and further comprise an amount of an alkali metal gasification catalyst, a transition metal gasification catalyst, and an alkaline earth metal source.

The alkali metal gasification catalyst can be an alkali metal and/or a compound containing alkali metal atoms. For example, the alkali metal gasification catalyst can comprise one or more alkali metal complexes (e.g., coordination complexes formed with one or more reactive functionalities on the surface or within the pores of the coal particulate, such as carboxylic acids and/or phenolic groups) formed with the coal and/or petroleum coke particulate.

Typically, the quantity of the alkali metal component in the composition is sufficient to provide, in the particulate composition, a ratio of alkali metal atoms to carbon atoms ranging from about 0.01, or from about 0.02, or from about 0.03, or from about 0.04, to about 0.06, or to about 0.07, or to about 0.08.

Suitable alkali metals include lithium, sodium, potassium, rubidium, cesium, and mixtures thereof. Particularly useful are potassium sources. Suitable alkali metal sources include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, one or more potassium complexes formed with the coal particulate, potassium carbonate, potassium bicarbonate, potassium hydroxide, or mixtures thereof. In some embodiments, the alkali metal gasification catalyst comprises one or more potassium complexes formed with coal particulate, carbonates, bicarbonates, hydroxides, or mixtures thereof.

The alkaline earth metal source can be an alkaline earth metal and/or a compound containing alkaline earth metal atoms. Typical alkaline earth metal sources can include magnesium, calcium, and/or barium sources, such as, but not limited to, magnesium oxide, magnesium hydroxide, magnesium carbonate, magnesium sulfate, calcium oxide, calcium hydroxide, calcium carbonate, calcium sulfate, barium oxide, barium hydroxide, barium carbonate, barium sulfate, or mixtures thereof. In certain embodiments, the alkaline earth source comprises a source of calcium; in certain other embodiments, the source of calcium is calcium hydroxide, calcium sulfate, or mixtures thereof.

Typically, the quantity of alkaline earth metal source in the composition is sufficient to provide from about 0.1 wt % to about 3.0 wt %, or to about 2.0 wt %, alkaline earth atoms by dry weight.

The transition metal gasification catalyst can be a transition metal and/or a compound containing transition metal atoms. Typical transition metal gasification catalysts can include sources, such as, but not limited to, V, Cr, Mn, Fe, Co, Ni, Cu, Mo, or mixtures thereof. For example, transition metal gasification catalyst can comprise one or more transition metal complexes (e.g., coordination complexes formed with one or more reactive functionalities on the surface or within the pores of the coal and/or petroleum coke particulate, such as carboxylic acids and/or phenolic groups). In certain embodiments, the transition metal gasification catalyst comprises an Fe source, Mn source, or mixtures thereof. In certain other embodiments, the transition metal gasification catalyst comprises one or more iron or manganese complexes formed with the coal particulate, FeO, $Fe_2O_3$, $FeSO_4$, MnO, $MnO_2$, $MnSO_4$, or mixtures thereof.

Typically, the quantity of transition metal gasification catalyst in the composition is sufficient to provide a ratio of transition metal atoms to carbon atoms ranging from about 0.001 to about 0.10.

Particulate Composition

Typically, each of the petroleum coke and coal sources can be supplied as a fine particulate having an average particle size of from about 25 microns, or from about 45 microns, up to about 2500 microns, or up to about 500 microns. One skilled in the art can readily determine the appropriate particle size for the individual particulates and the particulate composition. For example, when a fluid bed gasification reactor is used, the particulate composition can have an average particle size which enables incipient fluidization of the particulate composition at the gas velocity used in the fluid bed gasification reactor.

At least the coal particulate of the particulate composition comprises a gasification catalyst and optionally, a co-catalyst/catalyst additive as discussed previously. Typically, the gasification catalyst can comprise a source of at least one alkali metal and is present in an amount sufficient to provide, in the particulate composition, a ratio of alkali metal atoms to carbon atoms ranging from about 0.01, or from about 0.02, or from about 0.03, or from about 0.04, to about 0.08, or to about 0.07, or to about 0.06.

The ratio of the petroleum coke particulate and coal particulate in the particulate composition can be selected based on technical considerations, processing economics, availability, and proximity of the coal and petroleum coke sources. The availability and proximity of the two sources for these blends affect the price of the feeds, and thus the overall production costs of the catalytic gasification process. For example, the petroleum coke and the coal can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

More significantly, the petroleum coke and coal sources, as well as the ratio of the petroleum coke particulate to the coal particulate, can be used to control other material characteristics of the feedstock blend.

Typically, coal and other carbonaceous material include significant quantities of inorganic mater including calcium, alumina and silica which form inorganic oxides ("ash") in the gasification reactor. At temperatures above about 500 to 600° C., potassium and other alkali metals can react with the alumina and silica in ash to form insoluble alkali aluminosilicates. In this form, the alkali metal is substantially water-insoluble and inactive as a catalyst. To prevent buildup of the residue in a coal gasification reactor, a solid purge of char, i.e., solids composed of ash, unreacted carbonaceous material, and various alkali metal compounds (both water soluble and water insoluble) are routinely withdrawn. Preferably, the alkali metal is recovered from the char, and any unrecovered catalyst is generally compensated by a catalyst make-up stream. The more alumina and silica that is in the feedstock, the more costly it is to obtain a higher alkali metal recovery.

By preparing the particulate compositions in accordance with the resent invention, the ash content of the particulate composition can be selected to be, for example, to be about 20 wt % or less, or about 15 wt % or less, or about 10 wt % or less, depending on ratio of the particulates and/or the starting ash in the coal source. In other embodiments, the resulting particulate composition can comprise an ash content ranging from about 5 wt %, or from about 10 wt %, to about 20 wt %, or to about 15 wt %, based on the weight of the particulate composition. In other embodiments, the ash content of the particulate composition can comprise less than about 20 wt %, or less than about 15 wt %, or less than about 10 wt %, or less than about 8 wt %, or less than about 6 wt % alumina, based on the weight of the ash. In certain embodiments, the resulting particulate composition can comprise an ash content of less than about 20 wt %, based on the weight of the particulate composition where the ash content of the particulate composition comprises less than about 20 wt % alumina, or less than about 15 wt % alumina, based on the weight of the ash.

Such lower alumina values in the particulate composition allow for decreased losses of alkali catalysts in the gasification process. Typically, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall gasification process, as will be discussed later.

Additionally, the resulting particulate composition can have a significantly higher % carbon, and thus btu/lb value and methane product per unit weight of the particulate composition. In certain embodiments, the resulting particulate composition has a carbon content ranging from about 75 wt %, or from about 80 wt %, or from about 85 wt %, or from about 90 wt %, up to about 95 wt %, based on the combined weight of the coal and petcoke.

Methods of Making the Particulate Composition

The coal particulate, the petroleum coke particulate, or both are treated to load the particulate with a transition metal gasification catalyst, an alkali metal gasification catalyst, and an alkaline earth metal source. The particulate is treated in at least three separate processing steps in which separate feedstocks of coal and/or petcoke particulate are contacted with separate solutions (i.e., loading solutions). At least three separate loading solutions are used to load gasification catalyst or alkaline earth metal source onto separate feedstocks of carbonaceous particulate. For example, in embodiments using three loading solutions, one loading solution is an aqueous solution comprising a transition metal gasification catalyst, another is an aqueous solution comprising an alkali metal gasification catalyst, and another is an aqueous solution comprising an alkaline earth metal source.

In typical embodiments, none of the separate carbonaceous feedstocks is treated with more than one type of loading solution. For example, the same feedstock of carbonaceous particulate is not contacted with the loading solution comprising a transitional metal gasification catalyst and then also contacted with the loading solution comprising an alkali metal gasification catalyst. In a slurry comprising a carbonaceous feedstock and a loading solution, not all of the gasification catalyst or alkaline earth metal source will associate with the carbonaceous particulate. Therefore, when each slurry is dewatered, the recovered aqueous medium will contain gasification catalyst or alkaline earth metal source that did not associate with the carbonaceous particulate. Because each feedstock is treated only with a single loading solution, the aqueous medium recovered from the dewatering contains no (or substantially no) contamination from the loading solutions used to treat the other feedstocks. Therefore, the aqueous media recovered from dewatering each sample can be reused as at least part of a loading solution without cross-contaminating the loading solutions.

Any methods known to those skilled in the art can be used to associate the gasification catalysts or alkaline earth metal source with the carbonaceous particulate (i.e., loading). Several impregnation methods known to those skilled in the art can be employed to incorporate the gasification catalysts. These methods include but are not limited to, incipient wetness impregnation, evaporative impregnation, vacuum impregnation, dip impregnation, ion exchanging, and combinations of these methods. Gasification catalysts can be impregnated into the coal particulate by slurrying with a solution (e.g., aqueous) of the catalyst. The solutions for slurrying the coal particulate can be prepared from fresh transition metal gasification catalyst, alkali metal gasification catalyst, and/or alkaline earth metal source, or may include amounts of transition metal gasification catalyst, alkali metal gasification catalyst, and/or alkaline earth metal source that is recycled from a previous slurrying process or from the gasification of a carbonaceous composition into a plurality of gases. The contacting of the wet cake and the aqueous catalyst solution can occur at temperatures ranging from about 25° C. to about 100° C., or from about 25° C. to about 75° C., or from about 50° C. to about 75° C. for a predetermined residence time.

One particular method suitable for associating (or loading) a coal particulate with gasification catalysts to provide a particulate composition where the various components have been associated with the coal particulate via ion exchange is described in previously incorporated U.S. patent application Ser. No. 12/178,380. The ion exchange loading mechanism is maximized (based on adsorption isotherms specifically developed for the coal), and the additional catalyst retained on wet including those inside the pores is controlled so that the total catalyst target value is obtained in a controlled manner. Such loading provides a particulate composition as a wet cake. The catalyst loaded and dewatered wet coal cake typically contains, for example, about 50 wt % moisture. The total amount of catalyst loaded is controlled by controlling the concentration of catalyst components in the solution, as well as the contact time, temperature and method, as can be readily determined by those of ordinary skill in the relevant art based on the characteristics of the starting coal.

When the feedstocks of carbonaceous particulate are slurried with loading solutions, the resulting slurries are dewatered to provide separate particulate compositions as wet cakes. Methods for dewatering the slurry to provide a wet cake of the catalyzed coal particulate include filtration (gravity or vacuum), centrifugation, vibratory screening, and/or a fluid press. Typically, when the coal particulate is treated, via slurrying with an aqueous solution, in separate steps to provide one or more of the transition metal gasification catalyst, alkali metal catalyst, and alkaline earth source, the slurry is dewatered between each treatment step.

In typical embodiments, at least three separate feedstocks of carbonaceous particulate are each contacted with a loading solution. At least one carbonaceous feedstock is contacted with an aqueous solution comprising a transition metal gasification catalyst; at least one carbonaceous feedstock is contacted with an aqueous solution comprising an alkali metal gasification catalyst; and at least one carbonaceous feedstock is contacted with an aqueous solution comprising an alkaline earth metal source. In some embodiments, only feedstocks comprising (or substantially comprising) coal particulate are each contacted with a loading solution. In other embodiments, however, feedstocks comprising (or substantially comprising) coal particulate and at least one feedstock comprising (or substantially comprising) petroleum coke particulate are each contacted with a loading solution. When multiple feedstocks comprising coal particulate are used, these feedstocks of coal particulate need not have substantially the same composition (e.g., in terms of ash content, moisture content, etc.). Thus, different feedstocks of coal particulate may comprise samples of coal particulate that are compositionally different. One of skill in the art may select various compositions of coal particulate and adjust their relative proportions to achieve a final composition that, for example, is particularly suitable for gasification of a carbonaceous particulate composition into a plurality of gaseous products in the presence of steam and under suitable temperature and pressure (e.g., in terms of ash content, moisture content, or other properties).

In typical embodiments, each coal feedstock is contacted with a loading solution and a petroleum coke feedstock may or may not be contacted with a loading solution. The invention nevertheless encompasses embodiments where one or more additional loaded or non-loaded carbonaceous feedstocks are included in the final particulate composition. Such additional carbonaceous feedstocks include, but are not limited to, loaded or non-loaded coal particulate, loaded or non-loaded petroleum coke particulate, loaded or non-loaded biomass, and the like, as would be apparent to one of ordinary skill in the art. Further, the invention may also encompass embodiments where additional non-carbonaceous species are included in the final composition, provided that such non-carbonaceous species would not substantially diminish the efficiency or feasibility of the gasification of the resulting carbonaceous composition, as would be apparent to one of ordinary skill in the art.

Because separate feedstocks of carbonaceous particulate may be compositionally different, separate feedstocks of carbonaceous particulate may exhibit different affinities toward different loading species (e.g., transition metal gasification catalyst, alkali metal gasification catalyst, and alkaline earth metal source). Thus, one of skill in the art can match each feedstock of carbonaceous feedstock (in appropriate relative quantities) with a particular loading solution (in appropriate concentration of loading species), so as to achieve a final composition that is suitable for gasification into a plurality of gaseous products in the presence of steam and under suitable temperature and pressure. In some embodiments, the preparation of the particulate composition comprises providing three separate feedstocks of coal particulate and contacting each of the three feedstocks with a different loading solution, where one loading solution comprises a transition metal gasification catalyst, another comprises an alkali metal gasification catalyst, and another comprises an alkaline earth metal source. In these same embodiments, the preparation of the particulate comprises providing a petroleum coke particulate, which may or may not be contacted with a loading solution. In other embodiments, the preparation of the particulate composition comprises providing two separate feedstocks of coal particulate and one feedstock of petroleum coke particulate, and contacting each of the three feedstocks with a different loading solution, where one loading solution comprises a transition metal gasification catalyst, another comprises an alkali metal gasification catalyst, and another comprises an alkaline earth metal source. In these embodiments, any of the three feedstocks may be contacted with any one of the three loading solutions. For example, the petroleum coke particulate can be contacted with the solution comprising the transition metal gasification catalyst, while each of the two feedstocks of coal particulate (which need not be compositionally the same) are contacted with the solution comprising the alkali metal gasification catalyst or the solution comprising the alkaline earth metal source (i.e., one coal feedstock treated with one solution and the other coal feedstock treated with the other solution). In other similar examples, the petroleum coke particulate feedstock can be contacted either the solution comprising the alkali metal gasification catalyst or the solution comprising the alkaline earth metal source, while the two coal particulate feedstocks are treated with the two loading solutions not used to treat the petroleum coke particulate feedstock (i.e., one coal feedstock treated with one solution and the other coal feedstock treated with the other solution).

The combining of the separate feedstocks of carbonaceous particulate may or may not be preceded by a thermal treatment step. In embodiments where the combining occurs after thermal treatment, the thermally treated compositions are blended according to any methods suitable for the blending of particulate having low moisture content, including, but not limited to, kneading, and using vertical or horizontal mixers, for example, single or twin screw, ribbon, or drum mixers.

In embodiments where the combining of the carbonaceous feedstocks is not preceded by a thermal treatment step, at least a portion of each dewatered slurry is blended to form a final wet cake according to any methods suitable for the blending of wet cake particulate compositions, including, but not limited to, kneading, and using vertical or horizontal mixers, for example, single or twin screw, ribbon, or drum mixers.

When three or more separate wet cakes of loaded or non-loaded carbonaceous particulate are combined, the separate compositions need not be combined together in a single step. In some embodiments, for example, two separate loaded particulate compositions are combined together (or blended), and then the combined compositions are further combined with (or blended) with a third loaded particulate composition. For example, a coal particulate loaded with a transitional metal gasification catalyst and coal composition loaded with an alkali metal gasification catalyst are combined, and then the combined coal particulate composition is combined with a coal composition loaded with an alkaline earth metal source. In other embodiments, a coal particulate loaded with a transitional metal gasification catalyst and coal composition loaded with an alkaline earth metal source are combined, and then the combined coal particulate composition is combined with a coal composition loaded with an alkali metal gasification catalyst. For example, a coal particulate loaded with an alkaline earth metal source and coal composition loaded with an alkali metal gasification catalyst are combined, and then the combined coal particulate composition is combined with a coal composition loaded with a transition metal gasification catalyst.

The particulate composition typically comprises greater than about 50%, or greater than about 70%, or greater than about 85%, or greater than about 90%, of the total amount of catalyst loaded onto the coal matrix, for example, as ion-exchanged catalyst on the acidic functional groups of the coal. The amount of each component associated with the coal particulate can be determined according to methods known to those skilled in the art.

The wet cake(s) of loaded or non-loaded carbonaceous particulate is thermally treated to achieve a suitable moisture level. For example, after thermal treatment, the residual moisture content is less than about 6 wt %, or less than about 4 wt %, or less than about 3 wt %, or less than about 2 wt %, based on the total weight of the thermally treated composition. The thermal treatment may, for example, be carried out in a fluid bed slurry drier, or in any comparable apparatus known to those of skill in the art. As discussed above, the thermal treatment may be performed on each separate feedstock prior to combining the feedstocks, or may be performed after the separate feedstocks have been combined.

Once dried by thermal treatment, the particulate composition can be stored for future use or transferred to a feed operation for introduction into a gasification reactor. The particulate composition can be conveyed to storage or feed operations according to any methods known to those skilled in the art, for example, a screw conveyer or pneumatic transport.

In some embodiments, petroleum coke is dry ground, as described above, and is blended with the loaded coal particulate feedstocks while the loaded coal particulate feedstocks are in wet cake form (e.g., having not been subjected to thermal treatment). In embodiments where the separate loaded coal particulate feedstocks are blended in wet cake form (discussed above), the dry-ground non-loaded petroleum coke particulate may simply be blended with the wet cakes of loaded coal particulate. This can occur in a single step, where the four particulate feedstocks (i.e., coal loaded with transition metal gasification catalyst (wet cake), coal loaded with alkali metal gasification catalyst (wet cake), coal loaded with alkaline earth metal source (wet cake), and unloaded petroleum coke (dry)) are all blended together using any suitable means known to those of skill in the art, including, but not limited to, kneading, and using vertical or horizontal mixers, for example, single or twin screw, ribbon, or drum mixers. The four feedstocks can also be blended in multiple steps. For example, two of the loaded coal compositions in wet cake form may be blended together with part of the dry-ground unloaded petcoke particulate in a first step, and then the third loaded coal composition in wet cake form and the remainder of the dry-ground unloaded petcoke particulate can be added to the mixture in a second step. The number of suitable permutations for blending the multiple feedstocks in multiple steps is nearly unlimited. In these embodiments, where the dry-ground unloaded petcoke particulate is blended with the loaded coal particulates in wet cake form, the resulting blend may or may not be thermally treated. Because the dry-ground petcoke may absorb moisture from the wet cake, the composition may not always require thermal treatment to dry the composition. Once dried by thermal treatment, the particulate composition can be stored for future use or transferred to a feed operation for introduction into a gasification reactor.

In some embodiments, a petcoke particulate is wet ground and dewatered, as described above, and is then blended with the loaded coal particulate feedstocks while the loaded coal particulate is in wet cake form. In these embodiments, both the unloaded petcoke particulate and the loaded coal particulate will exist in wet cake form. The various wet cakes can be blended in a single step or in multiple steps. As mentioned above, the number of suitable permutations for blending the multiple feedstocks in multiple steps is nearly unlimited. In some particular embodiments, dry petroleum coke particulate is mixed with at least a portion of each of the loaded coal particulate feedstocks (wet cakes) to yield three loaded wet cakes comprising loaded coal particulate and petroleum coke particulate. The three wet cakes are then combined (in a single step or in multiple steps) using any suitable means known to those of skill in the art, including, but not limited to, kneading, and using vertical or horizontal mixers, for example, single or twin screw, ribbon, or drum mixers. After blending, the final wet cake may or may not be thermally treated. Once dried by thermal treatment, if necessary, the particulate composition can be stored for future use or transferred to a feed operation for introduction into a gasification reactor.

In other particular embodiments, the three loaded coal particulates are blended and optionally dried in any suitable order or permutation using means known to those of skill in the art (described above). Thereafter, the loaded coal particulate is combined with a dry petcoke particulate to form a particulate composition that can be stored for future use or transferred to a feed operation for introduction into a gasification reactor.

Catalytic Gasification Methods

The particulate compositions of the present invention are particularly useful in integrated gasification processes for converting coal to combustible gases, such as methane.

The gasification reactors for such processes are typically operated at moderately high pressures and temperature, requiring introduction of the particulate composition to the reaction zone of the gasification reactor while maintaining the required temperature, pressure, and flow rate of the feedstock. Those skilled in the art are familiar with feed systems for providing feedstocks to high pressure and/or temperature environments, including, star feeders, screw feeders, rotary pistons, and lock-hoppers. It should be understood that the feed system can include two or more pressure-balanced elements, such as lock hoppers, which would be used alternately.

In some instances, the particulate composition can be prepared at pressures conditions above the operating pressure of gasification reactor. Hence, the particulate composition can be directly passed into the gasification reactor without further pressurization.

Any of several catalytic gasifiers can be utilized. Suitable gasification reactors include counter-current fixed bed, co-current fixed bed, fluidized bed, entrained flow, and moving bed reactors. In one embodiment, a fluidized bed gasifier is used.

The particulate compositions are particularly useful for gasification at moderate temperatures of at least about 450° C., or of at least about 600° C. or above, to about 900° C., or to about 750° C., or to about 700° C.; and at pressures of at least about 50 psig, or at least about 200 psig, or at least about 400 psig, to about 1000 psig, or to about 700 psig, or to about 600 psig.

The gas utilized in the gasification reactor for pressurization and reactions of the particulate composition typically comprises steam, and optionally, oxygen or air, and is supplied to the reactor according to methods known to those skilled in the art. For example, any of the steam boilers known to those skilled in the art can supply steam to the reactor. Such boilers can be powered, for example, through the use of any carbonaceous material such as powdered coal, biomass etc., and including but not limited to rejected carbonaceous materials from the particulate composition preparation operation (e.g., fines, supra). Steam can also be supplied from a second gasification reactor coupled to a combustion turbine where the exhaust from the reactor is thermally exchanged to a water source and produce steam. Alternatively, the steam may be provided to the gasification reactor as described in previously incorporated U.S. patent application Ser. No. 12/395,309, entitled "STEAM GENERATION PROCESSES UTILIZING BIOMASS FEEDSTOCKS", and Ser. No. 12/395,320, entitled "REDUCED CARBON FOOTPRINT STEAM GENERATION PROCESSES".

Recycled steam from other process operations can also be used for supplying steam to the reactor. For example, when the slurried particulate composition is dried with a fluid bed slurry drier, as discussed previously, the steam generated through vaporization can be fed to the gasification reactor.

The small amount of required heat input for the catalytic coal gasification reaction can be provided by superheating a gas mixture of steam and recycle gas feeding the gasification reactor by any method known to one skilled in the art. In one method, compressed recycle gas of CO and $H_2$ can be mixed with steam and the resulting steam/recycle gas mixture can be further superheated by heat exchange with the gasification reactor effluent followed by superheating in a recycle gas furnace.

A methane reformer can be included in the process to supplement the recycle CO and $H_2$ fed to the reactor to ensure that enough recycle gas is supplied to the reactor so that the net heat of reaction is as close to neutral as possible (only slightly exothermic or endothermic), in other words, that the reaction is run under thermally neutral conditions. In such instances, methane can be supplied for the reformer from the methane product, as described below.

Reaction of the particulate composition under the described conditions typically provides a crude product gas and a char. The char produced in the gasification reactor during the present processes typically is removed from the gasification reactor for sampling, purging, and/or catalyst recovery. Methods for removing char are well known to those skilled in the art. One such method taught by EP-A-0102828, for example, can be employed. The char can be periodically withdrawn from the gasification reactor through a lock hopper system, although other methods are known to those skilled in the art. Processes have been developed to recover alkali metal from the solid purge in order to reduce raw material costs and to minimize environmental impact of a CCG process.

The char can be quenched with recycle gas and water and directed to a catalyst recycling operation for extraction and reuse of the alkali metal catalyst. Particularly useful recovery and recycling processes are described in U.S. Pat. No. 4,459,138, as well as previously incorporated U.S. Pat. No. 4,057,512 and US2007/0277437A1, and previously incorporated U.S. patent application Ser. Nos. 12/342,554, 12/342,715, 12/342,736 and 12/343,143. Reference can be had to those documents for further process details.

Crude product gas effluent leaving the gasification reactor can pass through a portion of the gasification reactor which serves as a disengagement zone where particles too heavy to be entrained by the gas leaving the gasification reactor (i.e., fines) are returned to the fluidized bed. The disengagement zone can include one or more internal cyclone separators or similar devices for removing fines and particulates from the gas. The gas effluent passing through the disengagement zone and leaving the gasification reactor generally contains $CH_4$, $CO_2$, $H_2$ and CO, $H_2S$, $NH_3$, unreacted steam, entrained fines, and other contaminants such as COS.

The gas stream from which the fines have been removed can then be passed through a heat exchanger to cool the gas and the recovered heat can be used to preheat recycle gas and generate high pressure steam. Residual entrained fines can also be removed by any suitable means such as external cyclone separators optionally followed by Venturi scrubbers. The recovered fines can be processed to recover alkali metal catalyst, or directly recycled back to feedstock preparation as described in previously U.S. patent application Ser. No. 12/395,385, entitled "CARBONACEOUS FINES RECYCLE".

The gas stream from which the fines have been removed can be fed to COS hydrolysis reactors for COS removal (sour process) and further cooled in a heat exchanger to recover residual heat prior to entering water scrubbers for ammonia recovery, yielding a scrubbed gas comprising at least $H_2S$, $CO_2$, CO, $H_2$, and $CH_4$. Methods for COS hydrolysis are known to those skilled in the art, for example, see U.S. Pat. No. 4,100,256.

The residual heat from the scrubbed gas can be used to generate low pressure steam. Scrubber water and sour process condensate can be processed to strip and recover $H_2S$, $CO_2$ and $NH_3$; such processes are well known to those skilled in the art. $NH_3$ can typically be recovered as an aqueous solution (e.g., 20 wt %).

A subsequent acid gas removal process can be used to remove $H_2S$ and $CO_2$ from the scrubbed gas stream by a physical absorption method involving solvent treatment of the gas to give a cleaned gas stream. Such processes involve contacting the scrubbed gas with a solvent such as monoethanolamine, diethanolamine, methyldiethanolamine, diisopropylamine, diglycolamine, a solution of sodium salts of amino acids, methanol, hot potassium carbonate or the like. One method can involve the use of SELEXOL® (UOP LLC, Des Plaines, Ill. USA) or RECTISOL® (Lurgi AG, Frankfurt am Main, Germany) solvent having two trains; each train consisting of an $H_2S$ absorber and a $CO_2$ absorber. The spent solvent containing $H_2S$, $CO_2$ and other contaminants can be regenerated by any method known to those skilled in the art, including contacting the spent solvent with steam or other stripping gas to remove the contaminants or by passing the spent solvent through stripper columns. Recovered acid gases can be sent for sulfur recovery processing. The resulting cleaned gas stream contains mostly $CH_4$, $H_2$, and CO and, typically, small amounts of $CO_2$ and $H_2O$. Any recovered $H_2S$ from the acid gas removal and sour water stripping can be converted to elemental sulfur by any method known to those skilled in the art, including the Claus process. Sulfur can be recovered as a molten liquid. Stripped water can be directed for recycled use in preparation of the catalyzed feedstock. One method for removing acid gases from the scrubbed gas stream is described in previously incorporated U.S. patent application Ser. No. 12/395,344, entitled "SELECTIVE REMOVAL AND RECOVERY OF ACID GASES FROM GASIFICATION PRODUCTS".

The cleaned gas stream can be further processed to separate and recover $CH_4$ by any suitable gas separation method known to those skilled in the art including, but not limited to, cryogenic distillation and the use of molecular sieves or ceramic membranes, or via the generation of methane hydrate is described in previously incorporated U.S. patent application Ser. No. 12/395,330, entitled "PROCESS AND APPARATUS FOR THE SEPARATION OF METHANE FROM A GAS STREAM". Typically, two gas streams can be produced by the gas separation process, a methane product stream and a syngas stream ($H_2$ and CO). The syngas stream can be compressed and recycled to the gasification reactor. If necessary, a portion of the methane product can be directed to a reformer, as discussed previously and/or a portion of the methane product can be used as plant fuel.

We claim:

1. A process for preparing a particulate composition, the process comprising the steps of:
    (a) providing a petroleum coke particulate;
    (b) providing a first coal feedstock, a second coal feedstock and, optionally, a third coal feedstock, each in particulate form;
    (c) contacting one of the petroleum coke particulate, the first coal feedstock, the second coal feedstock or the third coal feedstock, with a first aqueous solution comprising a transition metal gasification catalyst to form a first slurry;

(d) contacting one of petroleum coke particulate, the first coal feedstock, the second coal feedstock or the third coal feedstock, other than the one used for step (c), with a second aqueous solution comprising an alkaline earth metal source to form a second slurry;

(e) contacting one of the petroleum coke feedstock, the first coal feedstock, the second coal feedstock or the third coal feedstock, other than ones used for steps (c) and (d), with a third aqueous solution comprising an alkali metal gasification catalyst to form a third slurry; and (f) dewatering the first slurry, the second slurry, and the third slurry to form a first wet cake, a second wet cake, and a third wet cake, respectively;

wherein the process comprises the further steps of (1) or (2):

(1) (g1) thermally treating the first wet cake, the second wet cake, and the third wet cake with a dry inert gas to provide a first particulate, a second particulate, and a third particulate; and (h1) mixing at least a portion of each of the first particulate, the second particulate, and the third particulate to form a particulate composition, wherein, in (1), if the petroleum coke particulate is not used in step (c), (d) or (e), the third coal feedstock is provided and is used in one of steps (c), (d) or (e), and the petroleum coke particulate is mixed with at least a portion of each of the first particulate, second particulate and third particulate to form a particulate composition;

or (2) (g2) combining at least a portion of each of the first wet cake, the second wet cake, and the third wet cake to form a final wet cake; and (h2) optionally thermally treating the final wet cake with a dry inert gas as needed to form a particulate composition, wherein, in (2), if the petroleum coke particulate is not used in step (c), (d) or (e), the third coal feedstock is provided and is used in one of steps (c), (d) or (e); and (i) the petroleum coke particulate is mixed with at least a portion of each of the first wet cake, the second wet cake and the third wet cake to form the final wet cake, which is optionally thermally treated with a dry inert gas as needed to form a particulate composition; (ii) the petroleum coke particulate is mixed with at least a portion of the final wet cake, which is optionally thermally treated with a dry inert gas as needed to form a particulate composition; or (iii) the petroleum coke particulate is mixed with at least a portion of the particulate composition from step (h2).

2. The process according to claim 1, wherein the process comprises the steps of:

(a) providing a petroleum coke particulate;

(b) providing a first coal feedstock, a second coal feedstock, and a third coal feedstock, all in particulate form;

(c) contacting the first coal feedstock with a first aqueous solution comprising a transition metal gasification catalyst to form a first slurry;

(d) contacting the second coal feedstock with a second aqueous solution comprising an alkaline earth metal source to form a second slurry;

(e) contacting the third coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing the petroleum coke particulate with at least a portion of the first particulate, at least a portion of the second particulate, and at least a portion of the third particulate to form a particulate composition.

3. The process of claim 1, wherein the process comprises the steps of:

(a) providing a petroleum coke particulate;

(b) providing a first coal feedstock and a second coal feedstock, both in particulate form;

(c) contacting one of the petroleum coke particulate, first coal feedstock or second coal feedstock with a first aqueous solution comprising a transition metal gasification catalyst to form a first slurry;

(d) contacting one of petroleum coke particulate, the first coal feedstock or the second coal feedstock, other than the one used for step (c), with a second aqueous solution comprising an alkaline earth metal source to form a second slurry;

(e) contacting one of the petroleum coke feedstock, the first coal feedstock or the second coal feedstock, other than ones used for steps (c) and (d), with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) thermally treating the first wet cake, the second wet cake, and the third wet cake with a dry inert gas to provide a first particulate, a second particulate, and a third particulate; and (h) mixing at least a portion of the first particulate, at least a portion of the second particulate, and at least a portion of the third particulate to form a particulate composition.

4. The process according to claim 1, wherein the process comprises the steps of:

(a) providing a petroleum coke particulate;

(b) providing a first coal feedstock, a second coal feedstock, and a third coal feedstock, all in particulate form;

(c) contacting the first coal feedstock with a first aqueous solution comprising a transition metal gasification catalyst to form a first slurry;

(d) contacting the second coal feedstock with a second aqueous solution comprising an alkaline earth metal source to form a second slurry;

(e) contacting the third coal feedstock with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining at least a portion of the first wet cake, at least a portion of the second wet cake, and at least a portion of the third wet cake to form a final wet cake; and (h) mixing the petroleum coke particulate with at least a portion of the final wet cake to provide a particulate composition.

5. The process according to claim 1, wherein the process comprises the steps of:

(a) providing a petroleum coke particulate;

(b) providing a first coal feedstock and a second coal feedstock, both in particulate form;

(c) contacting one of the petroleum coke particulate, first coal feedstock or second coal feedstock with a first aqueous solution comprising a transition metal gasification catalyst to form a first slurry;

(d) contacting one of petroleum coke particulate, the first coal feedstock or the second coal feedstock, other than the one used for step (c), with a second aqueous solution comprising an alkaline earth metal source to form a second slurry;

(e) contacting one of the petroleum coke feedstock, the first coal feedstock or the second coal feedstock, other than ones used for steps (c) and (d), with a third aqueous solution comprising an alkali metal gasification catalyst to form a third slurry;

(f) dewatering the first slurry, the second slurry, and the third slurry to form a first wet cake, a second wet cake, and a third wet cake, respectively;

(g) combining at least a portion of the first wet cake, at least a portion of the second wet cake, and at least a portion of the third wet cake to form a final wet cake; and (h) thermally treating the final wet cake with a dry inert gas to form a particulate composition.

6. The process according to claim 1, wherein the alkali metal gasification catalyst comprises a source of potassium and/or sodium; the alkaline earth metal source comprises a source of calcium, magnesium and/or barium; and the transition metal gasification catalyst comprises Fe, Mn or mixtures thereof.

* * * * *